J. L. WENTZ.
CONVEYER.
APPLICATION FILED DEC. 17, 1919.
Reissued Nov. 2, 1920.
14,977.
3 SHEETS—SHEET 1.
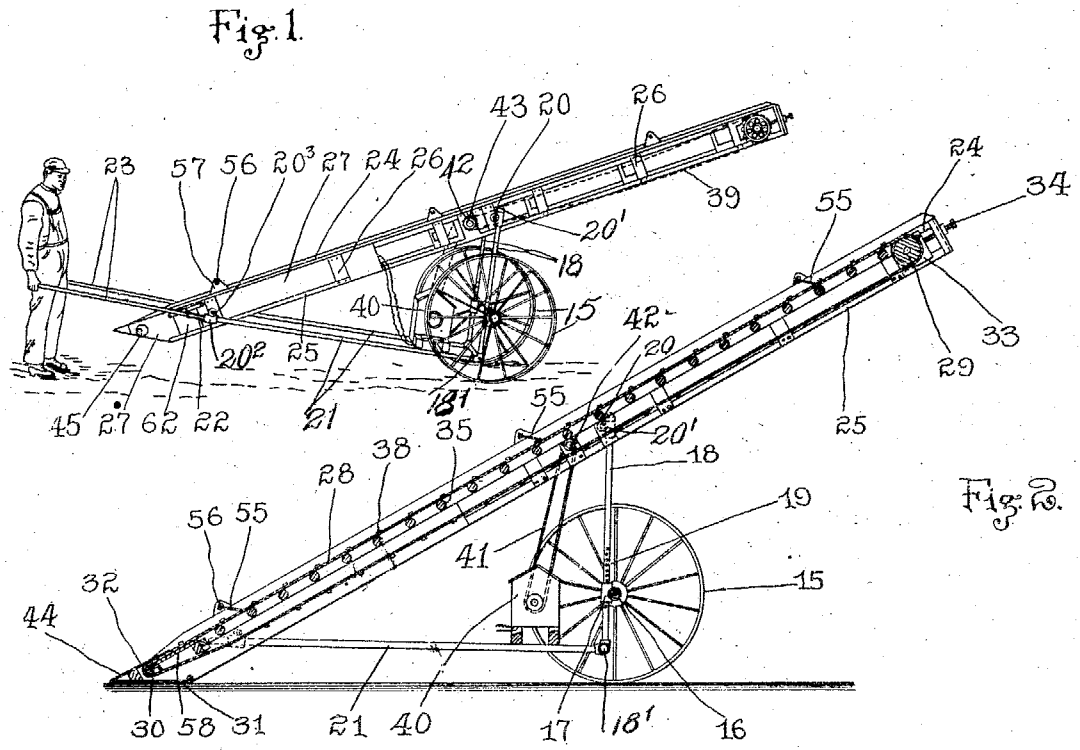
INVENTOR
Jere L. Wentz
BY
his ATTORNEY

J. L. WENTZ.

CONVEYER.

APPLICATION FILED DEC. 17, 1919.

Reissued Nov. 2, 1920.

14,977.

3 SHEETS—SHEET 2.

INVENTOR

Jere L. Wentz

BY his ATTORNEY

J. L. WENTZ.
CONVEYER.
APPLICATION FILED DEC. 17, 1919.
Reissued Nov. 2, 1920.
14,977.
3 SHEETS—SHEET 3.
Fig. 5.
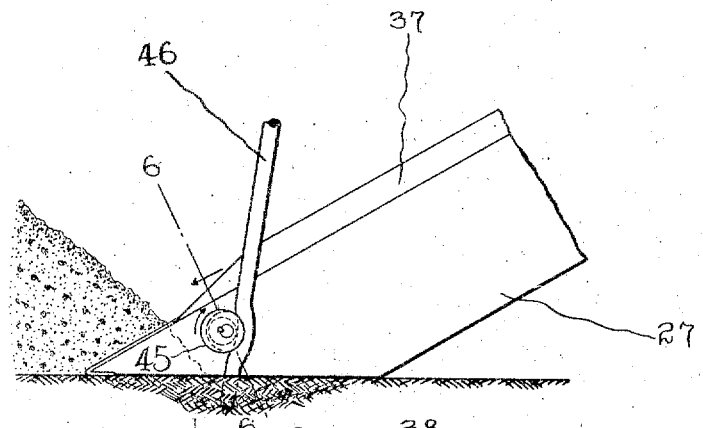
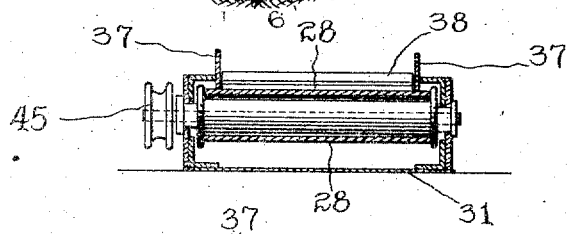
Fig. 6.
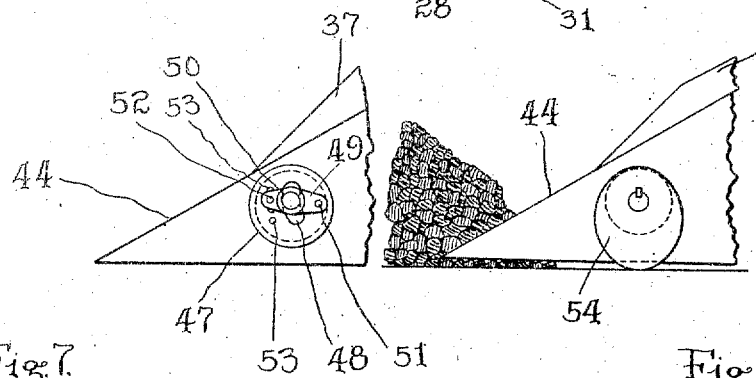
Fig. 7.
Fig. 8.
INVENTOR
Jere L. Wentz
BY
Anderson & Fowler Jr.
his ATTORNEY

REISSUED

UNITED STATES PATENT OFFICE.

JERE L. WENTZ, OF PASSAIC, NEW JERSEY, ASSIGNOR TO PORTABLE MACHINERY COMPANY, INC., OF PASSAIC, NEW JERSEY, A CORPORATION OF NEW JERSEY.

CONVEYER.

14,977. Specification of Reissued Letters Patent. Reissued Nov. 2, 1920.

Original No. 1,275,808, dated August 13, 1918, Serial No. 185,759, filed August 11, 1917. Application for reissue filed December 17, 1919. Serial No. 345,651.

*To all whom it may concern:*

Be it known that I, JERE L. WENTZ, a citizen of the United States, and a resident of Passaic, in the county of Passaic and State of New Jersey, have invented a new and Improved Conveyer, of which the following is a full, clear, and exact description.

Among the principal objects which the present invention has in view are: to provide a simple and convenient portable conveyer having self-actuated means for supplying the material to the conveyer; to prevent spilling the load being carried, to prevent the outer edges of the conveying belt from sagging between the rollers supporting the central section of the conveying belt; to prevent the load carried on the belt of the conveyer from traveling downward on the conveyer; to avoid accumulation of material on the under or pulley-engaged side of the conveying belt; to avoid accumulation of material on the idler drum supporting the conveying belt at the receiving end of the conveyer; and to avoid accumulation of material between the top and bottom extensions of the belt at the receiving end of the conveyer, and to provide means for adjusting the height and inclination of the device.

*Drawings.*

Figure 1 is a side view of the conveyer constructed and arranged in accordance with the present invention, the same being shown pictorially and in position to be moved from location to location;

Fig. 2 is a vertical longitudinal section on an enlarged scale of the conveyer;

Fig. 5 is a side view of an end fragment of the conveyer frame and a fragment of a pintle bar in position to be operated upon by a feeding vibrator with which the conveyer is provided;

Fig. 6 is a detail view on an enlarged scale in cross section, the section being taken as on the line 6—6 in Fig. 5;

Fig. 7 is a detail view on an enlarged scale showing a fragment of the receiving end of the conveyer and an eccentric vibrator disposed thereon;

Fig. 8 is a similar view showing a modified form of vibrator and feed member for the conveyer.

*Description.*

Figure 3:
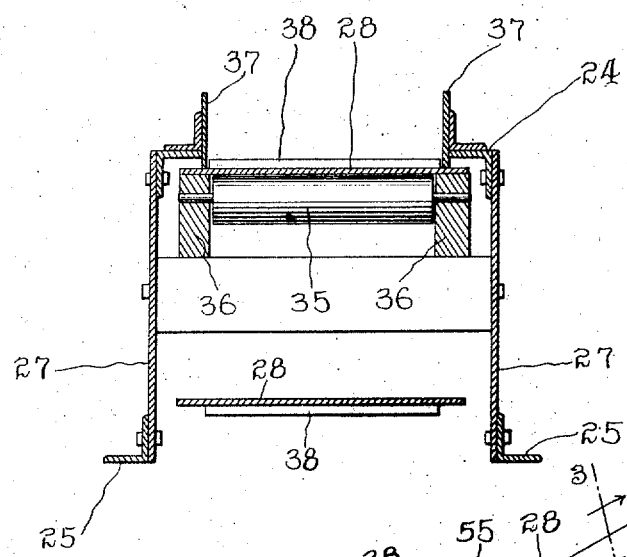
Fig. 3 is a cross section of the conveyer belt and frame, the section being taken as on the line 3—3 in Fig. 4.

As seen in the drawings, a conveyer constructed in accordance with the present invention has a frame which is partially supported and carried on wheels 15. The wheels 15 are mounted on an axle 16. The axle 16 is mounted in bearings extended bracketwise from sliding sleeves 17. The sleeves 17 are slidably mounted on a vertical U-shaped supporting frame comprising the standards 18 connected by a cross bar $18^1$ at their base and secured by pins extending through the perforations 19. The perforations 19 are arranged to permit a vertical adjustment of the standards 18 and the conveyer frame supported thereby.

The belt conveyer frame is mounted on a supporting bracket comprising a pair of vertical standards 18, 18 secured to the belt conveyer frame at a point adjacent its longitudinal center and between its center of gravity and its discharge end, a cross bar $18^1$ provided between the standards 18 and below the conveyer frame and a pair of struts or bars 21 extending from the lower ends of the standards 18 to the conveyer frame at a point adjacent its receiving end. I prefer to secure the standards 18 and the struts 21 to the conveyer frame by means of counterpart socket members $20^1$ and $20^2$ respectively mounted on pins or cross bars 20, $20^3$ respectively in the frame.

The ends 22 of the bars 21 are tubular to act as sockets for lifting handles 23. The handles 23 are detachably secured to the ends 22 and are employed to permit an attendant or operator to lift the receiving end of the conveyer.

The conveyer frame normally rests on its receiving end and is supported in an inclined position on the wheels 15, the standards 18 being secured to the frame at a point between its center of gravity and its discharge end.

The wheels 15 are so placed that when the lower end of the conveyer frame is raised, the center of gravity of the conveyer frame is disposed substantially in line with the axle 16, or, in other words, the total weight of the conveyer is poised on the carrying wheels 15.

When the conveyer is actively disposed, the handles 23 are withdrawn from engagement with the socketed ends 22.

The frame or housing of the conveyer, as best shown in Figs. 1 and 3 of the drawings, is constructed of angle bars 24 and 25. These bars extend the full length of the frame and are held in parallel spaced relation by braces 26 and cheek plates 27. The plates 27 operate to prevent coal or other material being handled by the conveyer from passing to the inner side thereof to be deposited on the under or inner side of the conveyer belt 28. The conveyer belt 28 extends lengthwise of the frame formed by the angle irons 24 and 25, and is supported mainly by the drums 29 and 30. The drum 30 is an idler and is located between a shoe plate 31 and a flexible apron 32. The drum 29, as shown best in Fig. 2, has bearings in sliding blocks 33. To adjust the blocks 33 is the function of the feed screws 34, which engage the blocks 33 to move the same lengthwise of and in guided relation to the angle bars 24 and 25.

Figure 4:
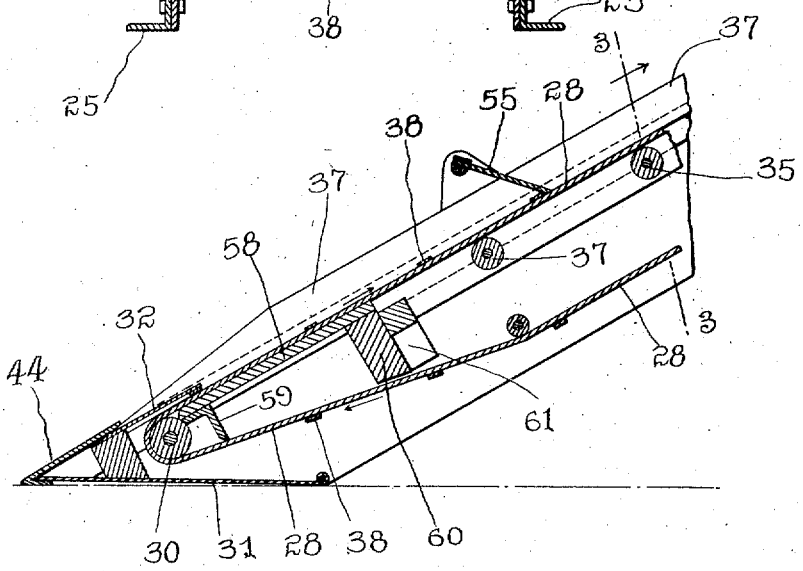
Fig. 4 is a vertical longitudinal section on an enlarged scale, of a fragment showing the lower or receiving end of the conveyer.

As best seen in Figs. 3 and 4 of the drawings, the central section of the belt 28 is supported by rollers 35. The rollers 35 have pintle journals for which are provided bearings in the supporting rails 36. The outer edges of the belt 28 overhang and rest upon the rails 36, which maintain the edges of said belt in fixed and close approximation to the lower edge of the cheek boards 37, and prevent sagging of the edges of the belt between the rollers 35. The belt 28 is suitably provided at intervals with cleats 38. The cleats 38 are preferably constructed of rubber. As seen best in Fig. 3 of the drawings, the cleats 38 extend above the belt 28 and between the cheek boards 37. The cleats serve in the active practice of the conveyer, to maintain the belt 28 in alinement and to impart vibration to apron 32.

The belt 28 is continuous and extends over the drum 29, which is driven by means of transmission chains 39 and 41, and a motor 40. The motor 40 is of any convenient desired type, and is preferably mounted on the platform $40^1$ constructed upon the bars 21, and is operatively connected with the chain 39 by a driving belt or chain 41 and transmission sprockets 43 and jack shaft 42. The plates 27 and 31, and nosing 44 form a boot for the conveyer which prevents the interference by the material being handled, with the underside of the belt where the same turns around the drum 30.

The nosing 44 is rigid and is fixedly connected with the apron 32. The apron 32 rests over the lower end of the belt 28, bridges the space between the nosing and the belt and accommodates the action of the said belt and of the cleats 38 mounted thereon. Through the agency of the apron 32 and the vibration imparted thereto by said cleats the coal or other material being handled is agitated and spread prior to being delivered to the belt 28, to be conveyed to the delivery end thereof. The agitation referred to as being imparted through the agency of the apron 32, is augmented by a tappet cam or eccentric 45 mounted at the end of the shaft bearing the drum 30, and extending beyond the plates 27. The cam 45, as seen best in Fig. 5 of the drawings, is employed in conjunction with a pintle bar 46. The pintle bar 46 in the present construction is usually formed from one of the handle bars 23. It is furnished with a pointed end for driving into the ground or floor over which the conveyer is working.

The operator having set the pointed end of the bar 46, moves the bar into the path of the eccentric 45, so that the same engages the said bar as the drum 30 rotates. It is obvious that the result of such action is to break up any solid formation of the pile being conveyed, and to force the nosing 44 into the pile until the upper stratum thereof rolls upon the apron 32 and belt 28.

In Fig. 7 of the drawings, a modified form of the eccentric is shown, the modification embodying a disk 47, which has an arcuate slot 48. Pivotally mounted on the disk 47, is a bearing plate 49. A perforated boss 50 extends from the plate 49. The axis of the perforation in the boss 50 coördinates with the center of the slot 48, when the plate 49 swings on the pivot 51 with which it is provided. The boss 50 tightly fits the end of the pintle of the drum 30 to be rotated therewith. The plate 49 is perforated at the end opposite the pivot 51 to receive a coupling pin 52. The pin 52 also engages any one of the sockets 53 with which the disk 47 is provided. The sockets 53 are arranged in a line concentric with the pivot 51 and median line of the slot 48. It is evident that as the pin 52 is disposed in one or other of the perforations 53, the eccentric arrangement of the disk 47 is modified relatively to the center of the drum 30. In this manner, provision is made for increasing or diminishing the vibratory action of the disk 47 on the bar 46.

In Fig. 8 of the drawings, a modified arrangement of the eccentric is disclosed. In this arrangement, an ovate cam 54 is keyed to the drum 30. The long diameter of the cam 54 is greater than the distance between the axis of the drum 30 and the bottom of the shoe plate 31. As a result of this construction, the cam 54 strikes upon the floor or ground on which the plate 31 is resting and lifts the same and the coal or other material superimposed thereon.

It will be understood that the employment of any form of the vibrating devices above described is optional.

To prevent the back flow of the load carried on the belt 28, there are provided aprons 55. As best shown in Fig. 2 of the drawings, the aprons 55 are pivotally mounted on shafts 56, and in bearings therefor formed in the brackets 57.

Any dislodged particles that roll back from the belt 28 and above the aprons 55, are prevented thereby from rolling backward to the receiving end of the conveyer.

As set forth hereinbefore, the plates 27 and the shoe plate 31 constitute a conveyer boot. Part of the function of the apron 32 is to permit any material which might find lodgment in the booth and on the apron 32 thereof to escape to be dislodged or forced upward by the cleats 38. It is obvious that the apron 32 will uplift and relieve any pressure from below imparted in the manner indicated.

While the cheek boards 37 and supporting rails 36 operate efficiently to prevent any lodgment of particles or the accumulation of grit and dust on the inner side of the belt 28 and on the lower reach thereof, in such operations as those in which the conveyer is employed, it is impossible to entirely exclude the particles of grit and dust. If such material reaches the drum 30, it is obvious that it will adhere to the surface thereof and accumulate to the ultimate effect that the diameter of the drum and coating thereon is increased and the perfect working adjustment of the apparatus might be destroyed. To avoid this, a scraper plate 58 is provided.

As seen best in Fig. 4 of the drawings, the plate 58 has a scraping end disposed in close approximation to the drum 30. The scraping end of the plate 58 is supported by an angle iron 59. The lower end of the angle iron 59, in service rests close to the upper surface of the lower stretch of the belt 28. This serves to remove any adhesions on the inner surface of the belt 28, which have escaped the scraping edge of the bolster 60, which, as shown, supports the tail end of the plate 58. The bolster 60 also supports inclined shelves 61, which are disposed in receiving relation to the plate 58. The outer end of the shelves 61 extends through openings 62 shown in Fig. 1 of the drawings. If any material passes the scraping edges of the bolster 60 and the angle iron 59 and finds lodgment on the drum 30, the scraping end of the plate 58 serves to dislodge the same. The material thus removed from the drum 30, is drawn by the belt 28 over the plate 58 and delivered to the shelves 61, and in turn is delivered by the said shelves beyond the plates 27 and outside of the apparatus.

*Operation.*

When operating with a conveyer constructed and arranged as above described, and as shown in the accompanying drawings, an attendant desiring to move the conveyer, places the handles 23 in the sockets provided in the ends 22 of the bars 21. The lower end of the conveyer is then lifted from the ground, when it will be found that the weight of the conveyer is nicely balanced on the carrying wheels 15. The conveyer is then moved to any location and the nosing 44 is disposed at the lower edge of a pile or dump of material to be conveyed. The handles 23 are then removed and the attendant presses the nosing 44 of the conveyer into the pile, using the bar 46 for this purpose. If a wagon or other vehicle is to be loaded from the drum, the wagon or vehicle is brought under the delivery end of the conveyer. The motor 40 is then started. The attendant using the pinch bar 46 or one of the handles 23, as indicated, presses against the cam 45, forcing the nosing 44 well under the dump or pile, where the surface material will flow to the apron 32 and belt 28 incident to the vibrating operation of the eccentric 45, as above described.

The material of the dump flowing as it does to the conveyer, is carried thereby over the head or delivery end of the conveyer, and deposited in the wagon or vehicle. When the vehicle has received its complement or load, the motor 40 is discontinued and the conveyer brought to rest to await the disposition of a second vehicle at the receiving station.

If the vehicle is low or for any reason it is determined to change the inclination of the conveyer and supporting frame therefor, this is accomplished by withdrawing the pins from the perforations 19 in which they rest for supporting the standards 18. The standards are then moved to the desired elevation and the supporting pins reinstated. It will be noted that in this adjustment, the operative relation of the belt 41 is not disturbed.

*Claims.*

1. A conveyer as characterized comprising an endless belt; a frame therefor embodying an idler roll for supporting said belt at the lower end of said frame; and a plate engaging said belt for supporting said belt adjacent said roll and for a distance therefrom, said plate having a sharpened edge adjacent the roll for removing accretions thereon for delivery of said accretions between said belt and plate.

2. A conveyer as characterized comprising an endless belt; a frame therefor embodying an idler roll for supporting said belt at the lower end of said frame; a plate engaging said belt for supporting said belt adjacent said roll and for a distance therefrom, said plate having a sharpened edge adjacent the roll for removing accretions thereon for delivery of said accretions between said belt and plate; and means for removing accretions from the inner surface of said belt adjacent said roll and on the belt-advancing side of said roll.

3. A conveyer as characterized comprising an endless belt; a frame therefor embodying an idler roll for supporting said belt at the lower end of said frame; a plate engaging said belt for supporting said belt adjacent said roll and for a distance therefrom, said plate having a sharpened edge adjacent the roll for removing accretions thereon for delivery of said accretions between said belt and plate; and means for removing accretions from the inner surface of said belt adjacent said roll and on the belt-advancing side of said roll, said means embodying a bolster for supporting said plate, said bolster having a sharpened edge disposed adjacent the lower reach of said belt and the inner surface thereof; and means for delivering accretions deposited on the inner side of said belt, laterally from the path of said conveyer.

4. A portable conveyer consisting of an endless belt; a housing for the said belt; means for varying the inclination of said housing, including a vertical U shaped supporting frame pivotally attached to the said housing; collars slidably mounted upon the uprights of the said frame; an axle carried by said collars; traction wheels mounted upon said axle; means for fixing said collars in adjusted positions; and bracing struts pivoted at one end to the belt housing and at the other end to the supporting frame.

5. In a portable conveyer, the combination of an endless belt; a frame for the said belt; means for varying the inclination of said frame, including vertical standards attached to said frame at each side thereof and a cross bar between said standards; collars slidably mounted on said standards; an axle carried by said collars; traction wheels mounted on said axle; means for fixing said collars in adjusted positions; and bracing struts between said standards and said frame.

6. In a portable conveyer, the combination of an endless belt; a frame for the said belt; a supporting bracket for said frame including a pair of vertical standards secured to said frame, a cross bar between the said standards and positioned below the frame, and bracing struts secured to said vertical standards and to said frame; an axle carried by said supporting bracket; and traction wheels mounted on said axle.

7. In a portable conveyer, the combination of an endless belt; a frame for the said belt; a supporting bracket for said frame including a pair of vertical standards secured to the said frame, a cross bar between said standards and positioned below the frame and bracing struts secured to said vertical standards and to said frame; an axle carried by said supporting bracket; traction wheels mounted on the said axle; a motor mounted on the conveyer; and a connecting medium between the motor and the belt.

8. In a portable conveyer the combination of an endless belt; a frame for said belt; a supporting bracket for said frame including a pair of standards secured to the frame; a pair of bracing struts between the said standards and the frame and a cross bar; an axle carried by said supporting bracket; traction wheels mounted on said axle; and a motor mounted on the conveyer and operatively connected with said belt.

9. In a device of the character described, the combination of a belt conveyer frame; an endless belt thereon, a supporting bracket for the frame including a pair of vertical bars and a pair of horizontal struts extending from the vertical bars to the receiving end of the frame; a platform mounted on the supporting bracket; a motor on the platform and operatively connected with the belt.

10. In a device of the character described, the combination of a belt conveyer frame; an endless belt thereon; a supporting bracket for the frame including a pair of vertical bars and a pair of horizontal struts; sliding sleeves adjustably mounted on the vertical bars; an axle carried by said sleeves and traction wheels mounted on the said axle.

11. In a device of the character described, the combination of a conveyer frame having a receiving end and a discharge end; an endless belt thereon; a supporting bracket for the frame comprising two uprights secured at their upper ends to the conveyer frame between the center of gravity of the conveyer frame and its discharge end; a cross bar between the said uprights below the conveyer frame and bars extending from the lower ends of the said uprights to the conveyer frame; an axle secured to said supporting frame and traction wheels on said axle whereby the conveyer frame will normally lie in an inclined position with its receiving end below the plane of its discharge end, the traction wheels being so disposed that the center of gravity of the conveyer frame is disposed substantially in line with the axle, when the conveyer frame is positioned horizontally.

In witness whereof I affix my signature.

JERE L. WENTZ.